(12) United States Patent
Huang et al.

(10) Patent No.: US 7,301,766 B2
(45) Date of Patent: Nov. 27, 2007

(54) TRANSMISSION DEVICE CAPABLE OF COOLING A HANDHELD ELECTRONIC DEVICE

(75) Inventors: Yi-Chang Huang, Taipei Hsien (TW); Yao-Chung Lin, Taipei Hsien (TW)

(73) Assignee: High Tech Computer Corp., Kwei-Shan Industrial Park, Tao-Yuan (TW)

( * ) Notice: Subject to any disclaimer, the term of this patent is extended or adjusted under 35 U.S.C. 154(b) by 226 days.

(21) Appl. No.: 11/160,979

(22) Filed: Jul. 19, 2005

(65) Prior Publication Data

US 2006/0227516 A1 Oct. 12, 2006

(30) Foreign Application Priority Data

Apr. 8, 2005 (TW) .............................. 94205501 U

(51) Int. Cl.
*H05K 7/20* (2006.01)
(52) U.S. Cl. ...................... 361/695; 361/686; 361/690; 361/692
(58) Field of Classification Search ........ 361/686–688, 361/690, 692, 695, 714; 312/223
See application file for complete search history.

(56) References Cited

U.S. PATENT DOCUMENTS

| | | | | |
|---|---|---|---|---|
| 5,959,836 A | * | 9/1999 | Bhatia | 361/687 |
| 6,058,009 A | * | 5/2000 | Hood et al. | 361/687 |
| 6,094,347 A | * | 7/2000 | Bhatia | 361/695 |
| 6,313,987 B1 | * | 11/2001 | O'Connor et al. | 361/687 |
| 6,563,703 B2 | * | 5/2003 | Xie | 361/687 |
| 6,567,262 B2 | * | 5/2003 | Meir | 361/676 |
| 6,570,760 B1 | * | 5/2003 | Wang | 361/687 |
| 6,571,340 B1 | | 5/2003 | Lee | |

* cited by examiner

*Primary Examiner*—Tuan T. Dinh
*Assistant Examiner*—Hung S Bui
(74) *Attorney, Agent, or Firm*—Winston Hsu

(57) ABSTRACT

A transmission device of a handheld electronic device including a housing having an inlet and an outlet, a fan installed within the housing for generating airflow from the inlet to the outlet and a guide tube installed on the housing having a first opening and a second opening, the first opening is located at the outlet side, the second opening is coupled to an opening of the handheld electronic device in a detachable manner to allow airflow generated by the fan into the handheld electronic device, the guide tube can improve cooling effect of the transmission device and the transmission device is capable of cooling the handheld electronic device to solve the heating problem while the handheld electronic device is being utilized.

9 Claims, 6 Drawing Sheets

TRANSMISSION DEVICE CAPABLE OF COOLING A HANDHELD ELECTRONIC DEVICE

BACKGROUND OF THE INVENTION

1. Field of the Invention

The present invention relates to a transmission device of a handheld electronic device, more particularly, a transmission device capable of cooling a handheld electronic device.

2. Description of the Prior Art

Functions of handheld electronic devices are becoming more powerful as technology progresses; even so, more heat will be given off as the handheld electronic device executes its functions. If heat generated from internal components of the handheld electronic device is not properly released, the functional operation and speed will be affected. In addition, overheating of the internal components can even cause damage to the device. However, in order to satisfy the needs of the consumers, the development of handheld electronic devices will continue towards miniature designs. The problem of cooling the handheld electronic device given a limited space, as mentioned-above has become an important research topic for manufacturers.

In general, there are two methods of cooling electrical products: the active cooling method and the passive cooling method. The active cooling method is implemented by adding a cooling device such as a fan to the electrical product. The passive cooling method utilizes a heat releasing metal plate that is attached to the internal component of the electrical product. In the handheld electronic device, such as a mobile phone, if the active cooling method is employed by installing a fan in the mobile phone, then the noise generated from the fan when the fan blades are spinning will negatively affect a user when having a conversation. Furthermore, the bearings of the fan are easily damaged; therefore, maintenance cost of the handheld electronic device increases as well. If non-active cooling such as a metal plate is attached to the internal component of the handheld electronic device then a reasonable surface area of the metal plate is needed to cool the device. The weight of the metal plate will increase the volume and the weight of the handheld electronic device.

Please refer to FIG. 1. FIG. 1 illustrates a diagram of a charger capable of cooling a conventional notebook computer (please refer to U.S. Pat. No. 6,571,340). The charger 100 comprises a cooling system 110, for generating airflow to cool the notebook computer. However, the arrangement of the internal components of the handheld electronic device is denser than the arrangement of the internal components of the notebook computer. Because of the increased density, if the speed of the airflow is not sufficiently fast, then the effect of cooling will decrease due to the limited space in the handheld electronic device. Furthermore, heat is also generated when the handheld electronic device transmits data, and the conventional charger 100 is unable to provide a function of data transmission and cooling at the same time.

SUMMARY OF THE INVENTION

The main objective of the claimed invention is to provide a transmission capable of cooling a handheld electronic device to solve the problem in the above-mentioned.

The claimed invention provides a transmission device of a handheld electronic device comprising: a housing comprising an inlet and an outlet; a fan installed within the housing for generating airflow from the inlet to the outlet; and a guide tube installed on the housing having a first opening positioned at the outlet of the housing, and a second opening smaller than the first opening for coupling to an opening of the handheld electronic device in a detachable manner to allow airflow generated by the fan flowing into the handheld electronic device.

The claimed invention further provides a transmission device of a handheld electronic device, comprising a housing comprising an inlet and an outlet; a fan, installed within the housing for generating airflow from the inlet to the outlet; a guide tube installed on the housing, the guide tube having a first end positioned at the outlet, a second end for coupling to an opening of the handheld electronic device in a detachable manner to allow airflow generated by the fan flowing into the handheld electronic device; a transmission unit installed on the housing, the transmission unit comprising a power cable for providing power to the handheld electronic device; a signal cable for providing signal to the handheld electronic device; and an input/output port for connecting to an input/output port of the handheld electronic device.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
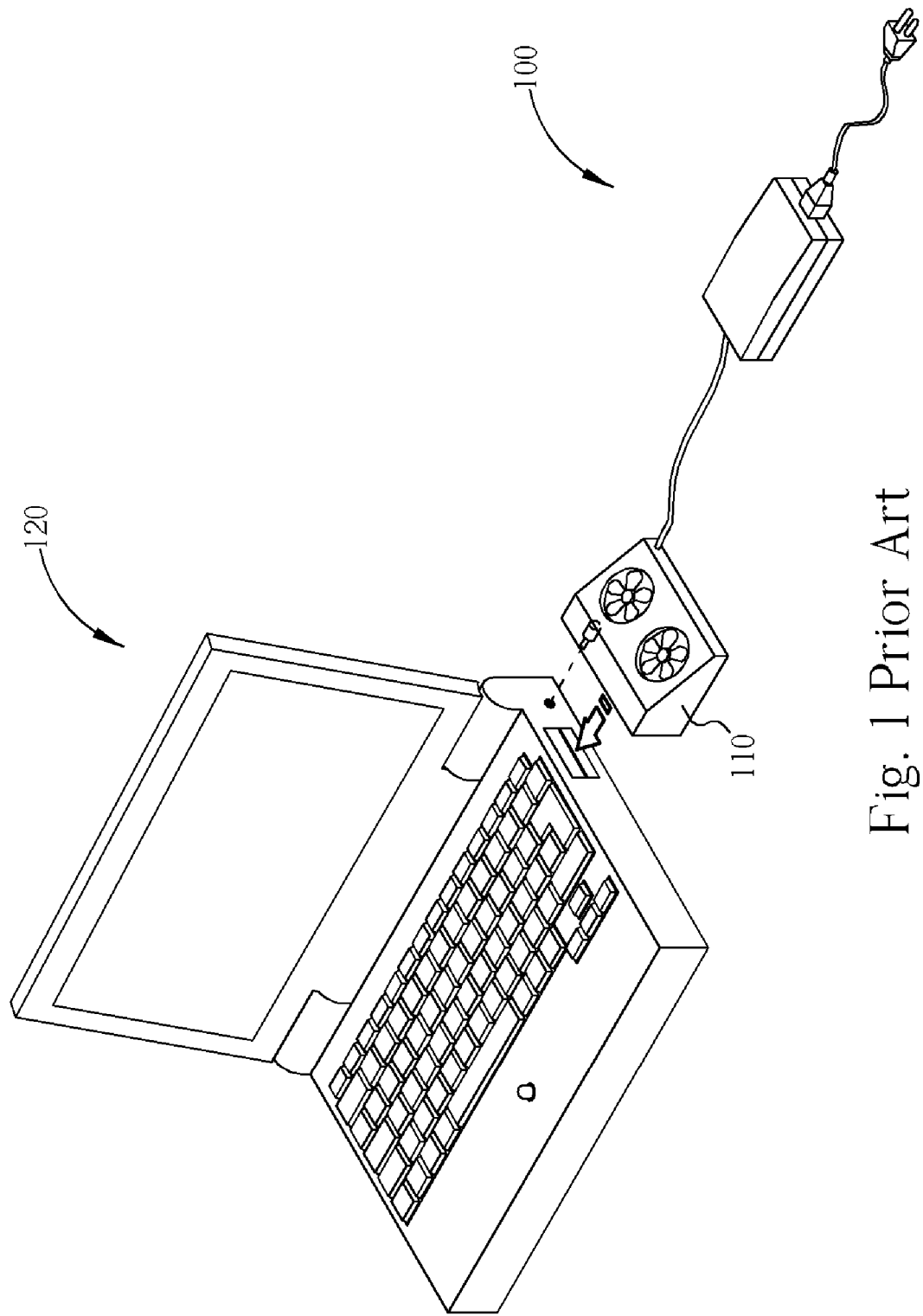
FIG. 1 illustrates a diagram of a charger capable of cooling a conventional notebook computer.
Figure 2:
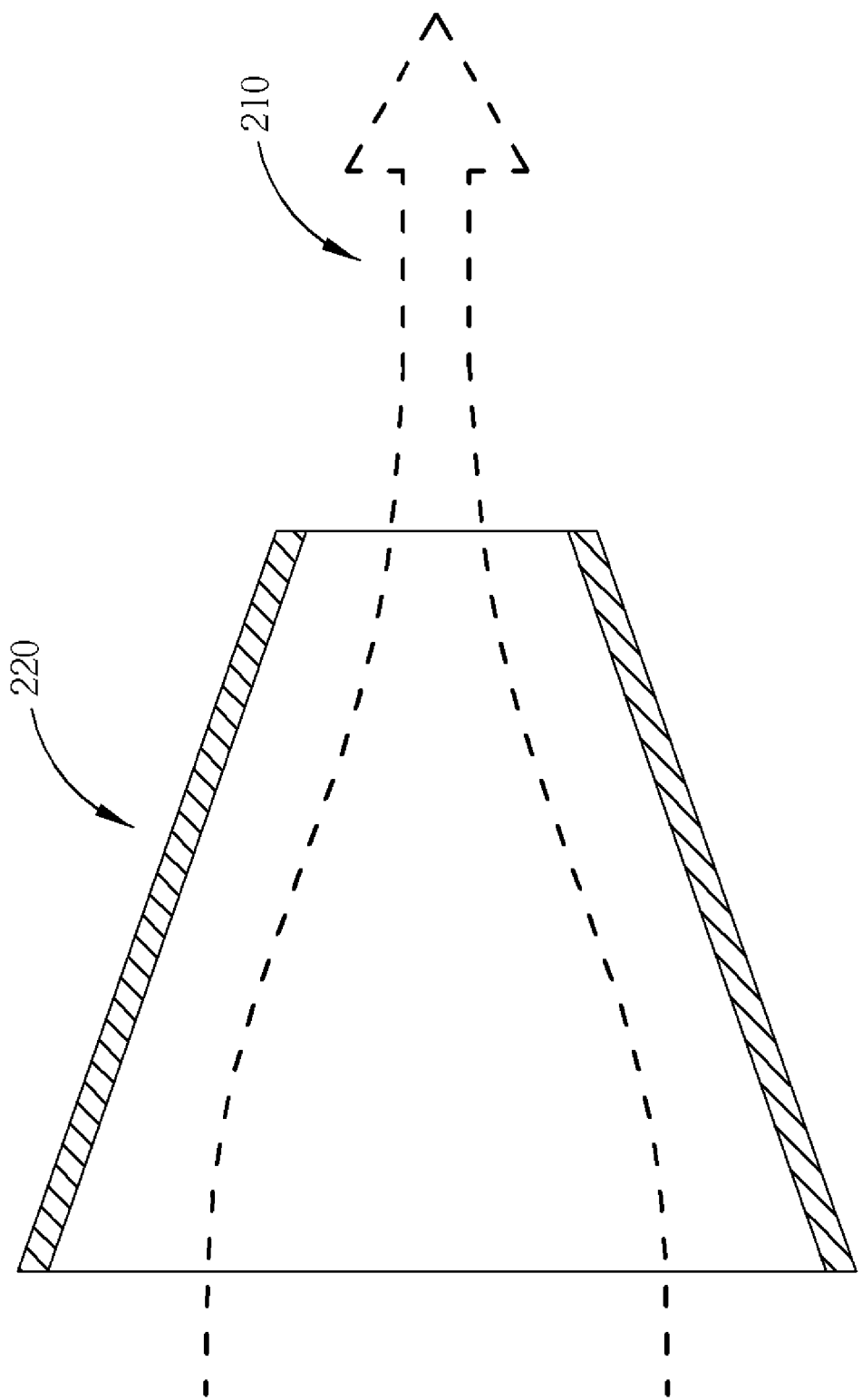
FIG. 2 illustrates a diagram of airflow flowing through a guide tube of the present invention.

Please refer to FIG. 2. FIG. 2 illustrates a diagram of airflow 210 flowing through a guide tube 220. According to the theory of hydrodynamics, when flow is at a steady state and density of the fluid is constant, flow rate of the fluid is also constant in passing through volume of a cross-section area at each unit of time, in another words, when the airflow 210 is in the guide tube 220, if cross-section area of a region of the guide tube 220 is greater, then the airflow will be slower, and if cross section area of the region of the guide tube is smaller, then the airflow will be faster. As shown in FIG. 2, as the guide tube 220 is a funnel-shaped guide tube, when the airflow 210 passes through the guide tube 220, according to the theory mentioned above, the airflow 210 will gradually become faster.

Figure 3:
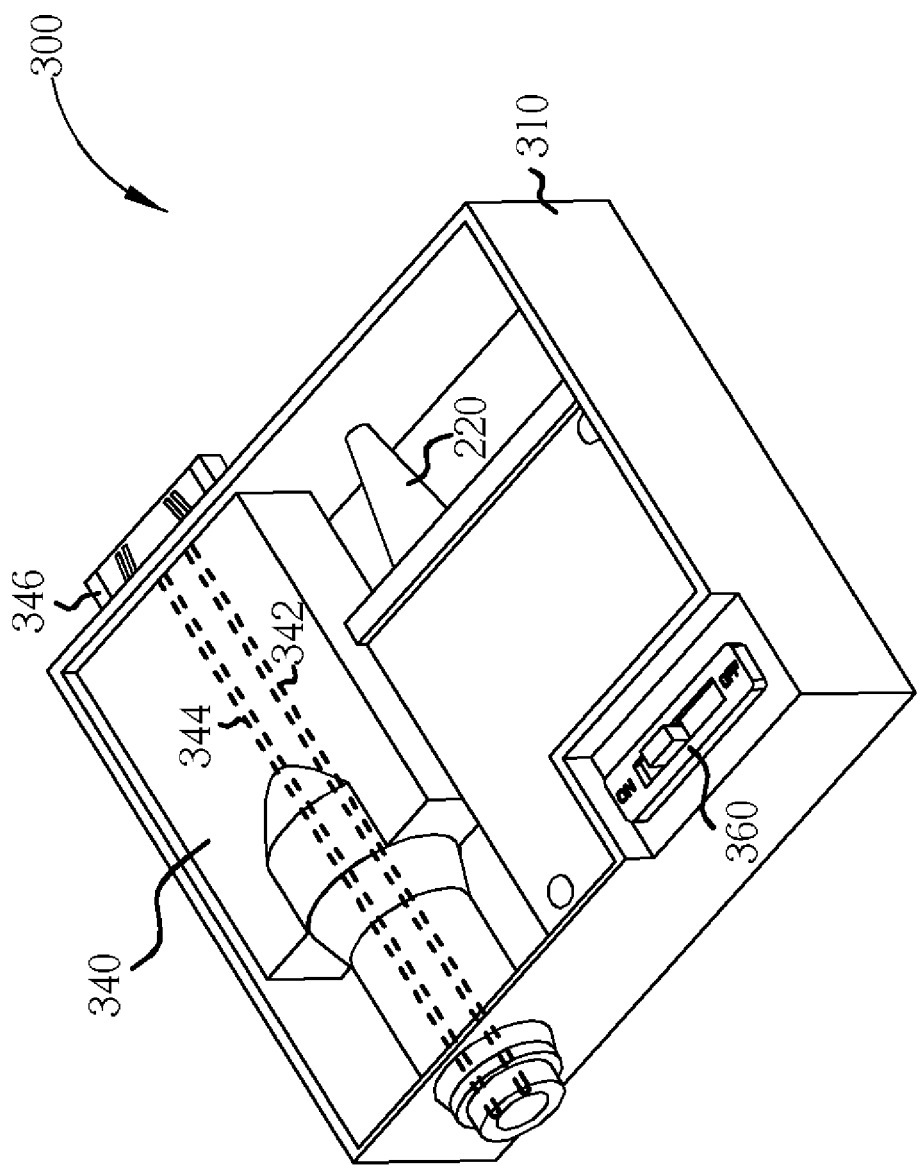
FIG. 3 illustrates an internal architecture diagram of a transmission device of the present invention capable of cooling a handheld electronic device.
Figure 4:
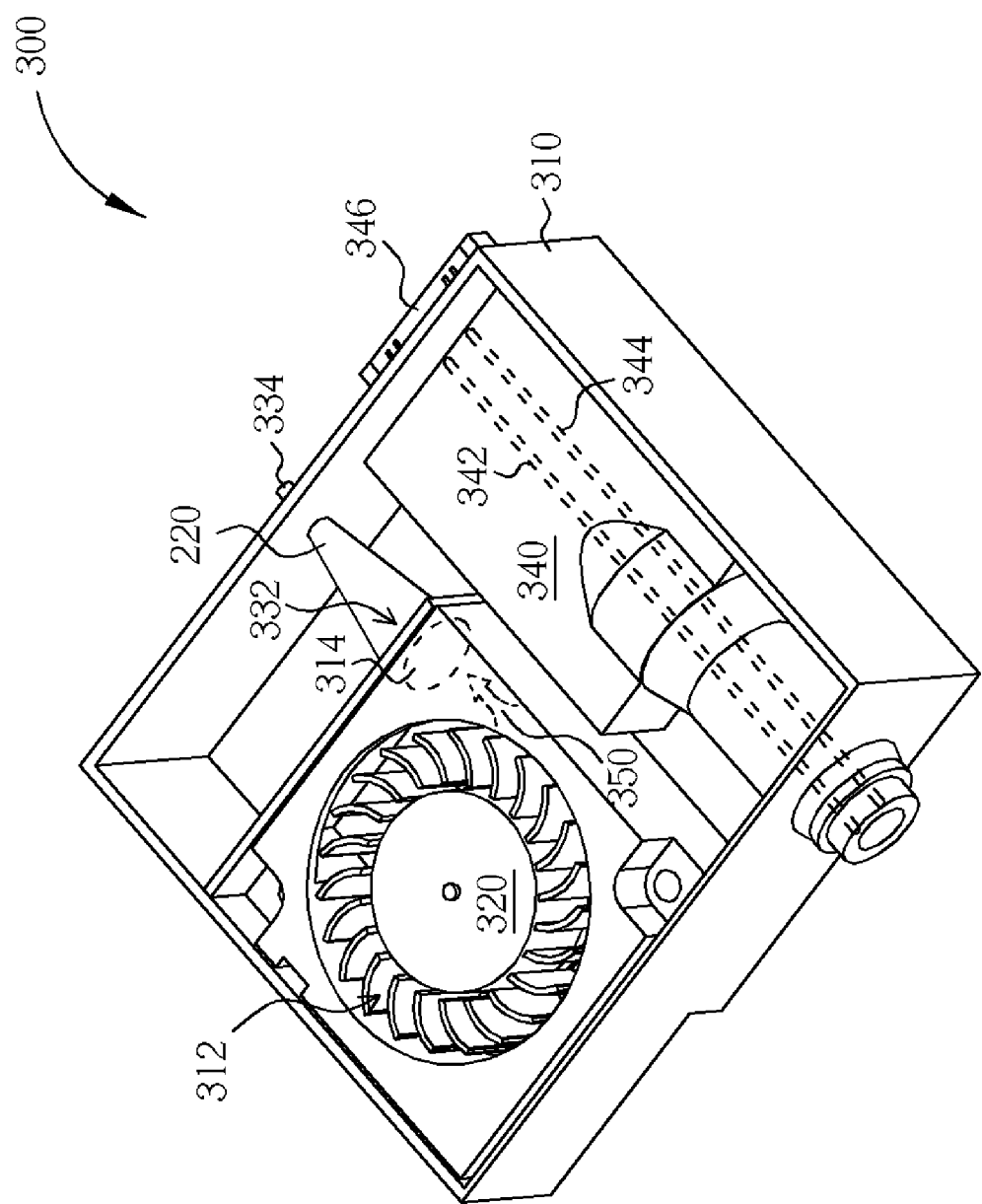
FIG. 4 is an internal architecture diagram that illustrates an opposite side of a transmission device of FIG. 3.

Please refer to FIG. 3 and FIG. 4. FIG. 3 illustrates an internal architecture diagram of a transmission device 300 capable of cooling a handheld electronic device. FIG. 4 is an internal architecture diagram that illustrates an opposite side of the transmission device 300 of FIG. 3. As shown in FIG. 3 and FIG. 4, the transmission device 300 comprises a housing 310, a fan 320, a guide tube 220 and a transmission unit 340. The housing 310 comprises an inlet and an outlet, when the fan 320 rotates, airflow 350 is generated from the inlet to the outlet, and the guide tube comprises a first opening and a second opening, the first opening is positioned at the outlet of the housing, the second opening is smaller than the first opening, according to the above-mentioned theory, airflow 350 generated by the fan 320 will become faster when flowing through the guide tube 220. Even given limited space in the handheld electronic device, the accelerated airflow 350 can still efficiently cool the handheld electronic device. In the embodiment of the present invention, the guide tube 220 is a funnel-shaped guide tube, or it can be a guide tube of other shapes, as long as one opening is bigger than the other opening. The transmission device 300 further comprises a switch 360 for controlling the on and off operation of the fan 320 so that a user is able to determine whether or not to cool the handheld electronic device.

Figure 5:
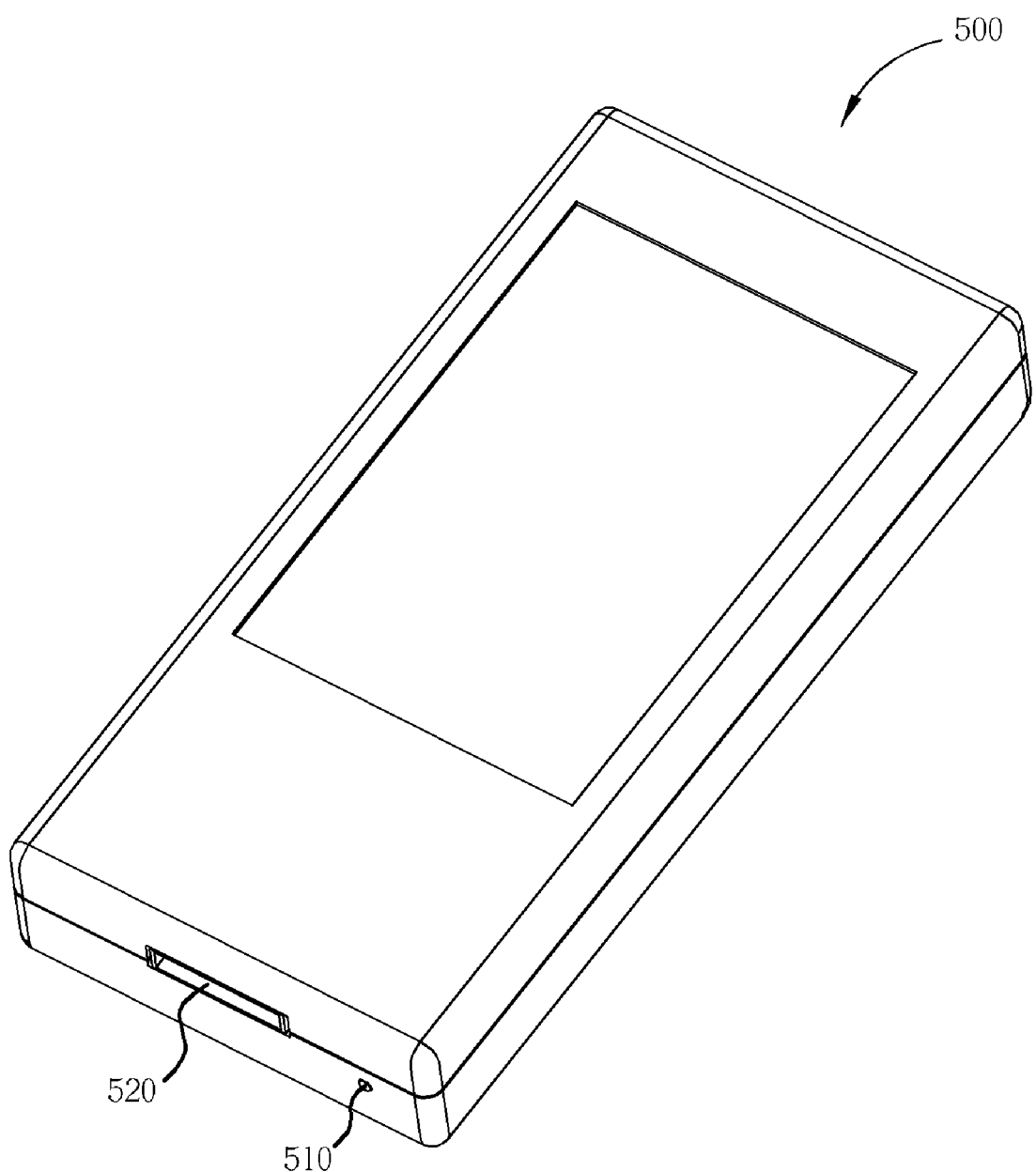
FIG. 5 illustrates a diagram of a handheld electronic device according to the present invention.
Figure 6:
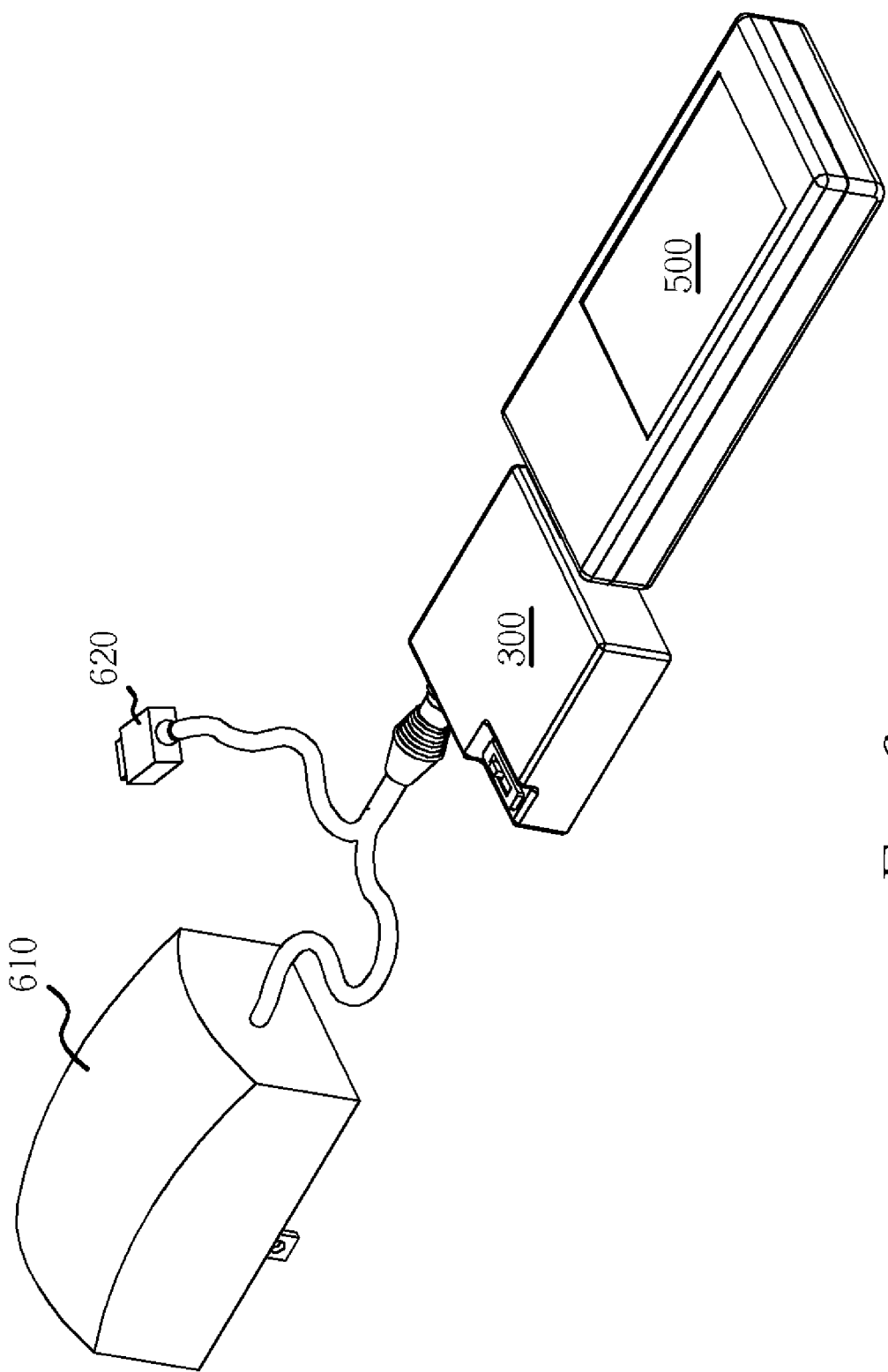
FIG. 6 illustrates a diagram of a transmission device of FIG. 3 connecting to a handheld electronic device of FIG. 5.

Please refer to FIG. 5 and FIG. 6, and at the same time, refer to FIG. 3. FIG. 5 illustrates a diagram of a handheld electronic device according to the present invention. FIG. 6 illustrates a diagram of a transmission device of FIG. 3 connecting to a handheld electronic device of FIG. 5. The handheld electronic device 500 having an opening 510, when the transmission device 300 is connected to the handheld electronic device 500, cooling will be performed as accelerated airflow is blown into the handheld electronic device 500 through the opening 510 from the second opening 334 of the guide tube 220. The transmission device comprises a power cable 342, a signal cable 344, and an input/output port 346. The input/output port 346 is utilized for connecting an input/output port 520 of the handheld electronic device 500. An end of the power cable 342 connects to the input/output port 346, and another end of the power cable 342 is utilized for connecting to a power supply 610, for example, an alternating current to direct current transformer is utilized for providing power to the handheld electronic device 500. An end of the signal cable 344 connects to the input/output port 346, and another end of the signal cable 344 is utilized for connecting to a connector 620, for example, a universal serial bus (USB) connector, when the connector 620 is connected to a electronic device, the handheld electronic device 500 is capable of transmitting data via the signal cable 344. In the other embodiment of the present invention, as the USB is capable of providing power and transmitting data simultaneously, therefore the power cable 342 and the signal cable 344 of the transmission unit 300 can connect to one USB connector simultaneously, and there is no need for the power cable 342 to further connect to the power supply 610 for providing power.

In conclusion to the above-mentioned, the present invention provides a transmission device capable of cooling a handheld electronic device. Especially when the handheld electronic device is a third generation (3G) mobile phone, charging or transmitting data will easily generate heat, which causes inconvenience for the user as well as negatively affecting the function of the mobile phone. Therefore the transmission device 300 is capable of cooling the handheld electronic device 500 when the handheld electronic device 500 is charging or transmitting data, in order to solve the above-mentioned problem.

In comparison to the prior art, the guide tube 220 of the present invention is capable of accelerating airflow 350 generated by the fan 320 to improve the cooling effect of the transmission device 300. The transmission device 300 is capable of cooling the handheld electronic device 500 while the handheld electronic device 500 is charging or transmitting data, to solve the heating problem when the handheld electronic device is being utilized.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A transmission device for cooling a handheld electronic device, the transmission device comprising:
    a housing comprising an inlet and an outlet;
    a fan installed within the housing for generating airflow from the inlet to the outlet;
    a guide tube installed on the housing having a first opening positioned at the outlet of the housing, and a second opening smaller than the first opening for coupling to an opening of the handheld electronic device in a detachable manner to allow airflow generated by the fan flowing into the handheld electronic device; and
    a transmission unit installed on the housing, the transmission unit comprising:
        a signal cable for providing signals to the handheld electronic device; and
        an input/output port for connecting to an input/output port of the handheld electronic device.

2. The transmission device of claim 1 wherein the transmission unit further comprises a power cable for providing power to the handheld electronic device.

3. The transmission device of claim 1 wherein the input/output port of the transmission unit is a universal serial bus (USB) port.

4. The transmission device of claim 1 further comprising a switch installed on the housing for controlling the on and off operation of the fan.

5. The transmission device of claim 1 wherein the guide tube is a funnel-shaped guide tube.

6. A transmission device for cooling a handheld electronic device, the transmission device comprising:
    a housing comprising an inlet and an outlet;
    a fan installed within the housing for generating airflow from the inlet to the outlet;
    a guide tube installed on the housing, the guide tube having a first end positioned at the outlet, and a second end for coupling to an opening of the handheld electronic device in a detachable manner to allow airflow generated by the fan flowing into the handheld electronic device; and
    a transmission unit installed on the housing, the transmission unit comprising:
        a power cable for providing power to the handheld electronic device;
        a signal cable for providing signals to the handheld electronic device; and
        an input/output port for connecting to an input/output port of the handheld electronic device.

7. The transmission device of claim 6 wherein the input/output port of the transmission unit is a universal serial bus (USB) port.

8. The transmission device of claim 6 further comprising a switch installed on the housing for controlling the on and off operation of the fan.

9. The transmission device of claim 6 wherein the guide tube is a funnel-shaped guide tube.

* * * * *